United States Patent
Atkinson

(10) Patent No.: US 10,325,275 B2
(45) Date of Patent: Jun. 18, 2019

(54) COMMUNICATIONS BANDWIDTH ENHANCEMENT USING ORTHOGONAL SPATIAL DIVISION MULTIPLEXING

(71) Applicant: Northrop Grumman Innovation Systems, Inc., Plymouth, MN (US)

(72) Inventor: Leonard A. Atkinson, Oak Hill, VA (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 0 days.

(21) Appl. No.: 15/806,081

(22) Filed: Nov. 7, 2017

(65) Prior Publication Data

US 2018/0249287 A1 Aug. 30, 2018

Related U.S. Application Data

(63) Continuation of application No. 14/642,225, filed on Mar. 9, 2015, now Pat. No. 9,813,145.

(51) Int. Cl.

| | |
|---|---|
| *H04W 72/12* | (2009.01) |
| *G06Q 30/02* | (2012.01) |
| *G06K 9/00* | (2006.01) |
| *G06T 7/77* | (2017.01) |
| *G01S 5/02* | (2010.01) |
| *G01S 5/06* | (2006.01) |
| *G01S 5/14* | (2006.01) |
| *G06Q 10/08* | (2012.01) |
| *H04W 4/021* | (2018.01) |

(Continued)

(52) U.S. Cl.
CPC ........ *G06Q 30/0201* (2013.01); *G01S 5/0294* (2013.01); *G01S 5/06* (2013.01); *G01S 5/14* (2013.01); *G06K 9/00335* (2013.01); *G06K 9/00771* (2013.01); *G06Q 10/0833* (2013.01); *G06T 7/246* (2017.01); *G06T 7/292* (2017.01); *G06T 7/77* (2017.01); *H04W 4/021* (2013.01); *H04W 24/00* (2013.01); *H04W 64/00* (2013.01); *G01S 11/06* (2013.01); *G06K 2209/27* (2013.01)

(58) Field of Classification Search
CPC ......... H04M 1/72572; H04M 3/42348; H04W 4/02; H04W 40/20
See application file for complete search history.

(56) References Cited

U.S. PATENT DOCUMENTS

| | | | |
|---|---|---|---|
| 5,903,549 | A | 5/1999 | Von der Embse et al. |
| 5,937,015 | A | 8/1999 | Dent et al. |

(Continued)

*Primary Examiner* — Pakee Fang
(74) *Attorney, Agent, or Firm* — Christensen, Fonder, Dardi & Herbert PLLC

(57) ABSTRACT

Systems and methods are described herein for communications bandwidth enhancement using Orthogonal Spatial Division Multiplexing (OSDM). For example, large sparse antenna arrays may be able to distinguish between signals emitted by multiple nearly collocated antennas, even if the signals have the same frequency, polarization, and coverage. Thus, the use of a large sparse antenna array may be able to resolve/isolate individual antennas on a single platform, allowing for OSDM, analogous to Orthogonal Frequency Divisional Multiplexing (OFDM). Using OSDM, multiple antennas on the same vehicle are able to reuse the same frequencies/polarizations without interference, thereby increasing spectrum availability while still providing the same transmitter power spectral density and total RF power emission.

18 Claims, 9 Drawing Sheets

(51) Int. Cl.
  *H04W 24/00*     (2009.01)
  *H04W 64/00*     (2009.01)
  *G06T 7/246*     (2017.01)
  *G06T 7/292*     (2017.01)
  *G01S 11/06*     (2006.01)

(56) References Cited

U.S. PATENT DOCUMENTS

| | | | |
|---|---|---|---|
| 6,240,072 B1 * | 5/2001 | Lo | H04B 7/2041 |
| | | | 370/316 |
| 7,236,758 B1 * | 6/2007 | Cheah | H04B 1/40 |
| | | | 348/723 |
| 8,320,840 B2 | 11/2012 | Smith et al. | |
| 8,345,716 B1 * | 1/2013 | Ehret | H04B 7/10 |
| | | | 370/334 |
| 9,037,093 B2 | 5/2015 | Smith et al. | |
| 2002/0055332 A1 | 5/2002 | Ram | |
| 2007/0184849 A1 | 8/2007 | Zheng | |
| 2007/0197241 A1 | 8/2007 | Singh et al. | |
| 2009/0034448 A1 | 2/2009 | Miller et al. | |
| 2009/0092112 A1 * | 4/2009 | Kim | H04W 84/20 |
| | | | 370/338 |
| 2011/0279324 A1 * | 11/2011 | Bolotski | G01S 19/30 |
| | | | 342/451 |
| 2012/0149415 A1 * | 6/2012 | Valaee | H04W 64/00 |
| | | | 455/507 |
| 2012/0302252 A1 * | 11/2012 | Alles | G01S 5/021 |
| | | | 455/456.1 |
| 2012/0309396 A1 * | 12/2012 | Aoyagi | H04W 36/0088 |
| | | | 455/436 |
| 2014/0135033 A1 * | 5/2014 | Alizadeh-Shabdiz | |
| | | | G01S 5/0263 |
| | | | 455/456.1 |
| 2015/0304019 A1 | 10/2015 | Shreve et al. | |
| 2015/0338519 A1 | 11/2015 | Derbez | |
| 2016/0259060 A1 | 9/2016 | Kurby et al. | |
| 2018/0026709 A1 * | 1/2018 | Buer | H04B 7/18534 |
| | | | 370/316 |

\* cited by examiner

900

902 RECEIVE, AT A FIRST RECEIVING STATION, A FIRST COMBINED SIGNAL COMPRISING A FIRST SIGNAL TRANSMITTED BY A FIRST SATELLITE ANTENNA AND A SECOND SIGNAL TRANSMITTED BY A SECOND SATELLITE ANTENNA

904 RECEIVE, AT A SECOND RECEIVING STATION, A SECOND COMBINED SIGNAL COMPRISING A FIRST SIGNAL TRANSMITTED BY A FIRST SATELLITE ANTENNA AND A SECOND SIGNAL TRANSMITTED BY A SECOND SATELLITE ANTENNA

906 DISTRIBUTING THE FIRST AND SECOND COMBINED SIGNALS TO ONE OR MORE BEAMFORMERS

908 DETERMINE THE FIRST SIGNAL AND THE SECOND SIGNAL BASED ON THE RECEIVED FIRST AND SECOND COMBINED SIGNALS

FIG. 9

COMMUNICATIONS BANDWIDTH ENHANCEMENT USING ORTHOGONAL SPATIAL DIVISION MULTIPLEXING

CROSS REFERENCE TO RELATED APPLICATIONS

This application is a continuation of U.S. patent application Ser. No. 14/642,223, filed Mar. 9, 2015, which is incorporated herein by reference in its entirety.

BACKGROUND

Satellites in orbit typically transmit one or more beams using antennas in order to downlink and uplink data. However, limited spectrum availability limits the capabilities of both government-funded and commercial satellite programs. For example, the image collection times for satellites are frequently limited by data downlink rates rather than the capabilities of the satellite, such as tasking/power availability. The government spectrum is dwindling due to commercial pressures and auctions of frequency bands, and even when a frequency band becomes available, commercial spectrum licenses can cost hundreds of millions of dollars per band. The limited availability of suitable frequency bands for satellite communications has led to several methods of spectrum reuse. For example, many satellite systems already utilize high order modulation (near the practical limit for bits/second/Hertz of bandwidth) with frequency, polarization, code, time, and multi-region reuse plans. However, even with these reuse plans, satellite system capacities continue to be limited due to spectrum unavailability. In addition, many bands also include power spectral density limitations, therefore, increasing modulation order and transmitter power within a confined bandwidth to increase data rate is not allowed.

SUMMARY

Systems and methods are described herein for communications bandwidth enhancement using orthogonal spatial division multiplexing. For example, large sparse antenna arrays may be able to distinguish between signals emitted by multiple satellite antennas, even if the signals have the same frequency, polarization, and coverage. High gain apertures may drive spacecraft emissions below the regulatory coordination threshold and open up new bands on a secondary non-interfering basis. Thus, the use of a large sparse antenna array may be able to resolve/isolate individual antennas on a single satellite, allowing for "Orthogonal Spatial Division Multiplexing" (OSDM) whereby each synthesized antenna beam towards one antenna has nulls towards the other antennas, analogous to Orthogonal Frequency Divisional Multiplexing (OFDM) where each frequency has spectrum sidebands having nulls at adjacent carrier frequencies. Using OSDM, multiple, preferably uniformly-spaced, antennas on the same vehicle are able to reuse the same frequencies/polarizations without interference, thereby increasing downlink spectrum availability. As an added benefit, utilizing multiple antennas may improve the signal-to-noise ratios of each individual signal accordingly, thus using two satellite downlink antennas with two OSDM signals may allow each signal to be 3 dB lower. In this manner, the power spectral density on the ground may be unchanged in spite of an increased data rate (e.g., 2×) within the same bandwidth and total satellite power. This architecture may also add inherent redundancy of satellite transmitter systems, so that if one OSDM transmitter, antenna, signal interconnect, or antenna pointing system fails, the other can operate at half capacity conventionally without OSDM.

In one aspect, a method for transmitting signals from a communications satellite comprises receiving, at a first receiving station (also referred to herein as a ground station), a first combined signal comprising a first signal transmitted by a first satellite antenna, and a second signal transmitted by a second satellite antenna. The first satellite antenna and the second satellite antenna may be on the same satellite or on different satellites and may be separated by a first distance. For example, the first satellite antenna may be attached to the main body of the satellite while the second satellite antenna is connected to an extended boom at a fixed distance. As another example, the first and second satellite antennas may be on respective first and second satellites that are flying in formation. In some embodiments, the satellite(s) may be orbiting the Earth at a geostationary orbit (e.g., approximately 22,236 miles above the Earth's equator) such that the satellite(s) maintain substantially the same position above the Earth's surface.

The first and second signal may be transmitted at a single frequency. In some embodiments, the first and second signal may also have the same polarization and coverage area.

The method may further comprise receiving, at a second receiving station, a second combined signal comprising the first signal transmitted by the first satellite antenna, and the second signal transmitted by the second satellite antenna. The second combined signal may be the same signal or a different signal as the first combined signal. As an illustrative example, the first and second satellite antennas may transmit respective first and second signals, which are received by the first receiving station, as the first combined signal, and by the second receiving station, as the second combined signal. In this example, the second combined signal may comprise the same first and second signals as the first combined signal, but may have a different magnitude, phase, and/or relative time delay than the first combined signal.

The first receiving station and the second receiving station may be separated by a second distance. In some embodiments, the ground antenna spacing (i.e., the second distance) may be proportional to satellite range, wavelength/frequency of the signals, and the satellite antenna spacing (i.e., the first distance). In some embodiments, the ground antenna spacing is set at a distance to provide an additive array factor (i.e., the in-phase addition of the two antenna signals) having a peak on one of the two satellite antennas and the first null on the second satellite antenna. Thereby, the subtractive array factor (i.e., the in-phase subtraction of the two antenna signals) will have a null on the first satellite antenna and a peak on the second antenna. The ground spacing may be a function of the satellite antenna spacing, satellite range, and signal wavelength.

The method may further comprise determining the first signal and the second signal based on the received first combined signal and the received second combined signal. In some embodiments, determining the first and the second signal comprises combining the received first combined signal and second combined signal. For example, beamformers may be utilized to combine the received first combined signal and the second combined signal, taking into account, for example, the number of antennas, array spacing, total array size, signal frequency, signal phase shift, and/or time delay.

Although the aforementioned method is discussed in relation to two satellite antennas and two receiving stations, it will be appreciated by a person of ordinary skill in the art that any number of satellite antennas and receiving stations may be utilized with the systems and methods described herein. In some embodiments, the number of frequency reuses may be less than, or equal to, the number of ground antennas. In some embodiments, the number of ground antennas may be greater than, or equal to, the number of satellite antennas. In some embodiments, the method may further comprise receiving, at a third receiving station, a third combined signal comprising the first signal transmitted by the first satellite antenna, and the second signal transmitted by the second satellite antenna. The third combined signal may be the same or different than the first and the second combined signal.

The third combined signal may have a different magnitude, phase, and/or time delay than the first or the second combined signal. The third receiving station may be separated from the second receiving station by a third distance, and in some embodiments, the third distance is equal to the second distance. In embodiments where more than two receiving stations are utilized, the receiving stations may be arranged in any suitable orientation and with any suitable spacing. For example, three receiving stations may be spaced equally along a line. In another example, three receiving stations may be spaced equally at the corners of an equilateral triangle.

In some embodiments, the first, second, and/or third combined signals may further comprise a third signal transmitted by a third satellite antenna. The third signal may be transmitted at the same frequency, polarization, and/or coverage area as the first and the second signals. The third satellite antenna may be spaced from the first and the second satellite antenna. The three satellite antennas may be arranged in any suitable orientation and with any suitable spacing. For example, the three antennas may be arranged along a straight line or at the corners of an equilateral triangle.

BRIEF DESCRIPTION OF THE DRAWINGS

The systems and methods described herein are set forth in the appended claims. However, for purposes of explanation, several illustrative embodiments are set forth in the following figures.

FIG. 9 shows a flow diagram of illustrative steps for communications bandwidth enhancement using OSDM, in accordance with an embodiment of the present disclosure.

DETAILED DESCRIPTION

Figure 1:
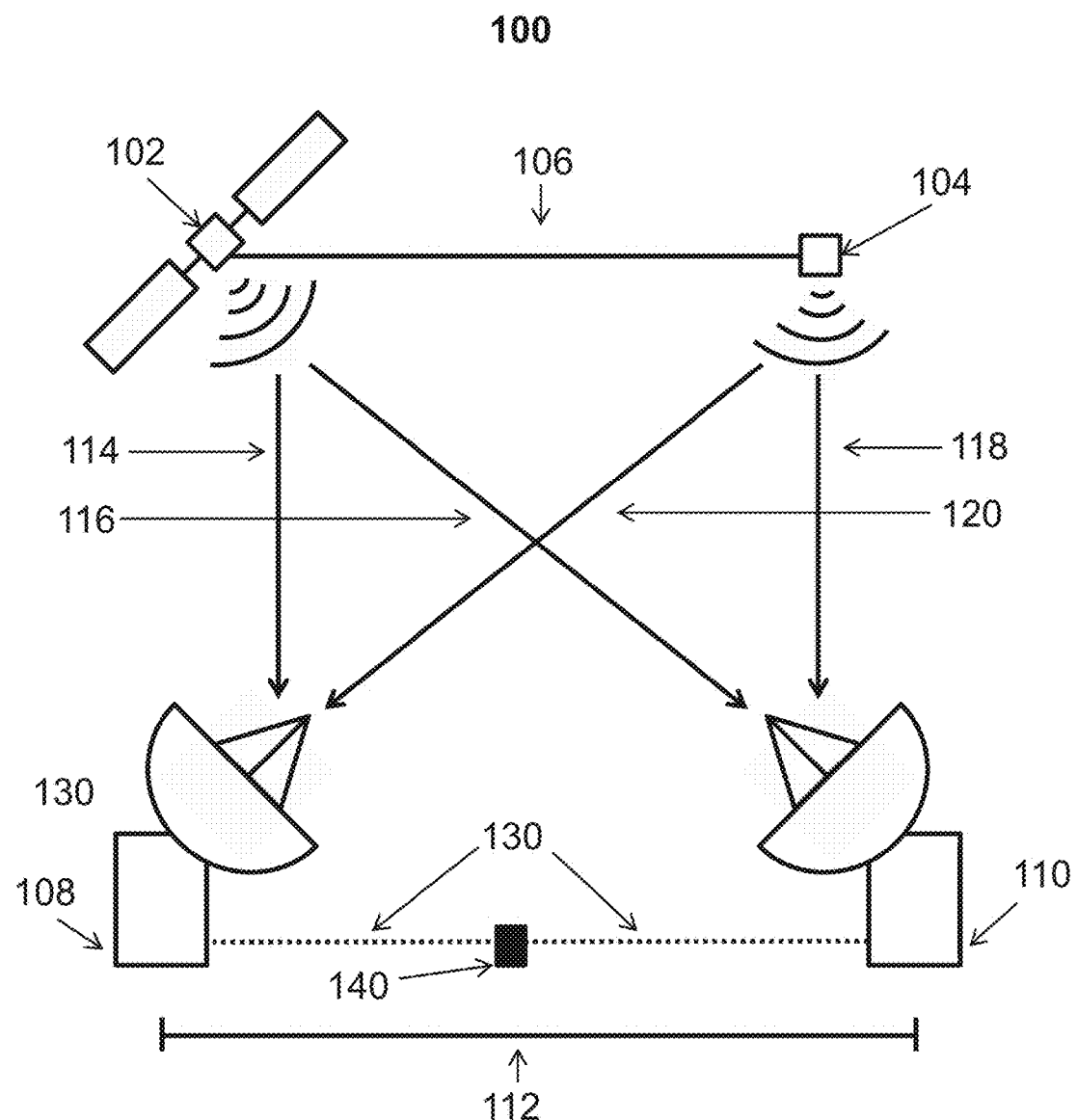
FIG. 1 shows an illustrative diagram of a satellite communications system, in accordance with an embodiment of the present disclosure.

To provide an overall understanding of the disclosure, certain illustrative embodiments will now be described, including systems and methods for communications bandwidth enhancement using OSDM. However, the systems and methods described herein may be adopted and modified as is appropriate for the application being addressed and that the systems and methods described herein may be employed in other suitable applications, and that such other additions and modifications will not depart from the scope thereof.

Systems and methods are described herein for communications bandwidth enhancement using OSDM. For example, large sparse antenna arrays may be able to distinguish between signals emitted by multiple satellite antennas, even if the signals have the same frequency, polarization, and coverage. High gain apertures may drive spacecraft emissions below the regulatory coordination threshold and open up new bands on a secondary non-interfering basis. Thus, the use of a large sparse antenna array may be able to resolve/isolate individual antennas on a single satellite, allowing for OSDM, analogous to OFDM. Using OSDM, multiple antennas on the same vehicle are able to reuse the same frequencies/polarizations without interference, and without increasing the downlink power flux spectral density, thereby increasing downlink spectrum availability.

In one aspect, a method for transmitting signals from a communications satellite comprises receiving, at a first receiving station, a first combined signal comprising a first signal transmitted by a first satellite antenna and a second signal transmitted by a second satellite antenna. The first satellite antenna and the second satellite antenna may be on the same satellite or on different satellites and may be separated by a first distance. For example, the first satellite antenna may be attached to the main body of the satellite while the second satellite antenna is connected to an extended boom at a fixed distance. As another example, the first and second satellite antennas may be on respective first and second satellites that are flying in formation. In some embodiments, the satellite(s) may be orbiting the Earth at a geostationary orbit (e.g., approximately 22,236 miles above the Earth's equator) such that the satellite(s) maintain substantially the same position above the Earth's surface.

The first and second signal may be transmitted at a single frequency. In some embodiments, the first and second signal may also have the same polarization and coverage area.

The method may further comprise receiving, at a second receiving station, a second combined signal comprising the first signal transmitted by the first satellite antenna and the second signal transmitted by the second satellite antenna. The second combined signal may be the same signal or a different signal as the first combined signal. As an illustrative example, the first and second satellite antennas may transmit respective first and second signals, which are received by the first receiving station, as the first combined signal, and by the second receiving station, as the second combined signal. In this example, the second combined signal may comprise the same first and second signals as the first combined signal, but may have a different magnitude, phase, and/or time delay than the first combined signal.

Figure 5:
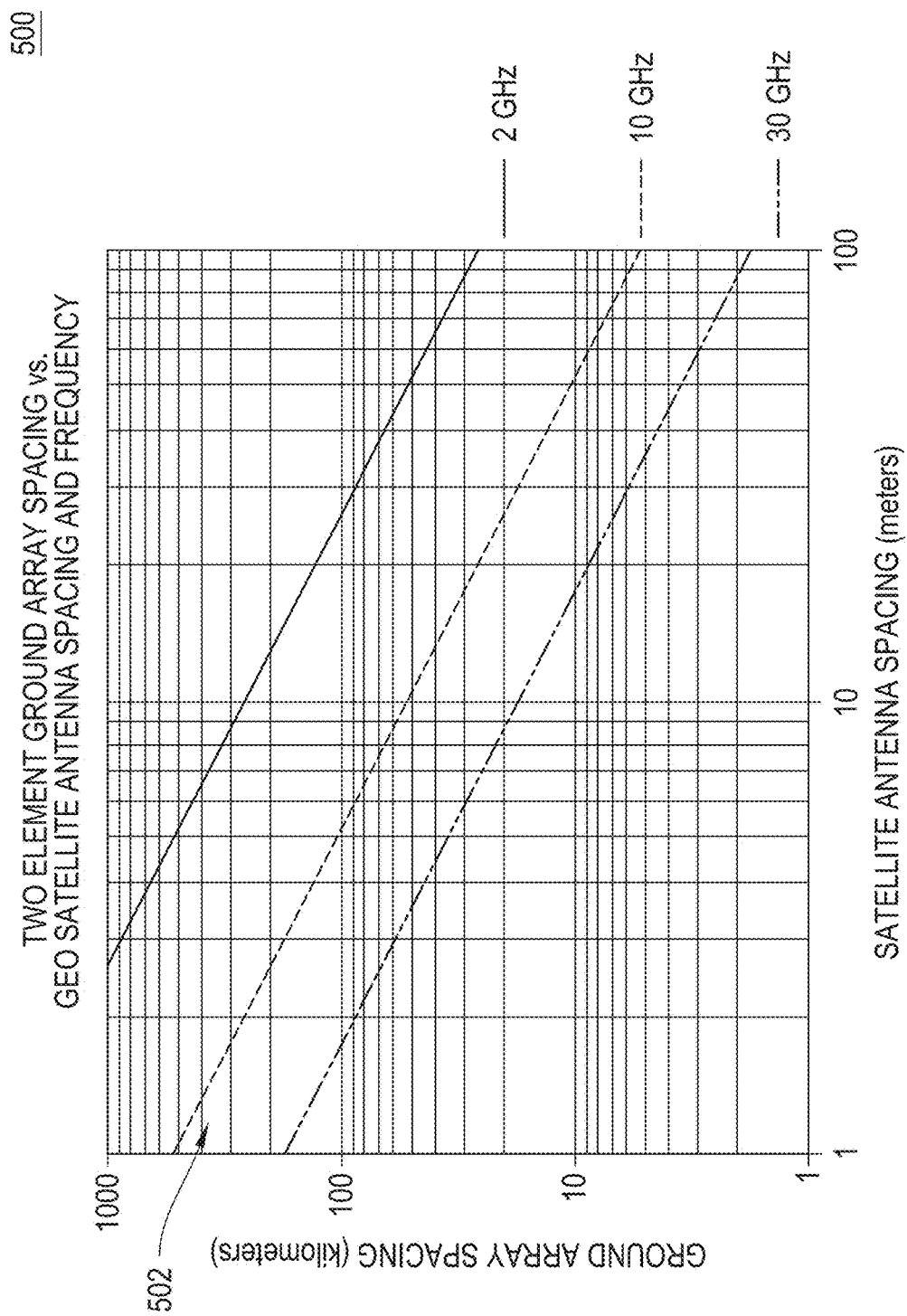
FIG. 5 shows an illustrative example of a relationship between satellite antenna spacing, ground array spacing, and frequency, in accordance with an embodiment of the present disclosure.
Figure 6:
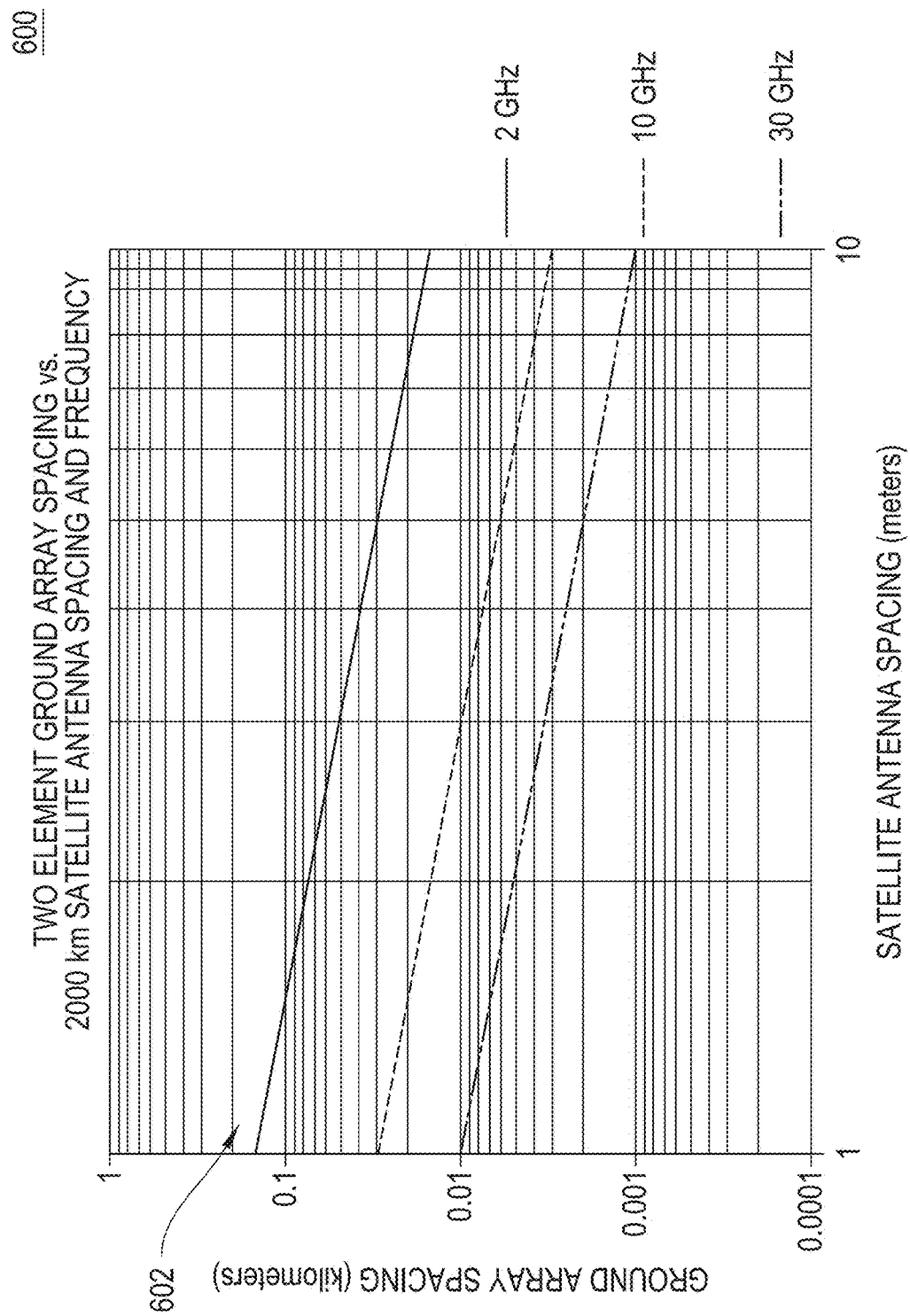
FIG. 6 shows an illustrative example of a relationship between satellite antenna spacing, ground array spacing, and frequency, in accordance with an embodiment of the present disclosure.

The first receiving station and the second receiving station may be separated by a second distance. In some embodiments, the satellite antenna spacing (i.e., the first distance) may be proportional to satellite range, wavelength/frequency of the signals, and the ground antenna spacing (i.e., the second distance). In some embodiments, the ground antenna spacing is set at a distance that provides an additive array factor having a peak on one of the two satellite antennas and the first null on the second satellite antenna. Thereby, the subtractive array factor will have a null on the first satellite antenna and a peak on the second antenna. The ground spacing may be a function of the satellite antenna spacing, satellite range, and signal wavelength. Specifically, a two element ground array has a first null at an angle $\theta$ where $2\pi/\lambda * D * \sin(\theta) = \pi$, with $\lambda$=the operating wavelength and D=ground array spacing. Using the small angle approximation between two satellite mounted antennas, $\theta = S/a$ where S=satellite antenna spacing and a=satellite altitude/range above the ground stations. Simultaneously solving these two equations shows that ground stations separated by a distance $D = \lambda * a / (2*S)$ can orthogonally receive two satellite antennas separated by a distance of S. This relationship for geostationary satellites leads to practical geometries for satellite feeder systems. Graphs 500 and 600, depicted in FIGS. 5 and 6 respectively, provide an illustrative example of the relationship between antenna spacing, ground station spacing, and signal frequency. For example, a 10 GHz downlink 502 could be spatially reused by two antennas separated 1 meter apart on a geostationary satellite by interferometrically combining the two signals with ground stations spaced 525 km apart. As another example, a 2 GHz downlink 602, depicted in FIG. 6, could be spatially reused by two antennas separated by 1 meters apart on a satellite orbiting at an altitude of 2000 km by interferometrically combining the two signals with ground stations spaced 150 meters apart. Similarly, by extending array theory, three 1 meter spaced antenna transmissions may be orthogonally received by three ground stations spaced over a comparable distance.

Figure 7:
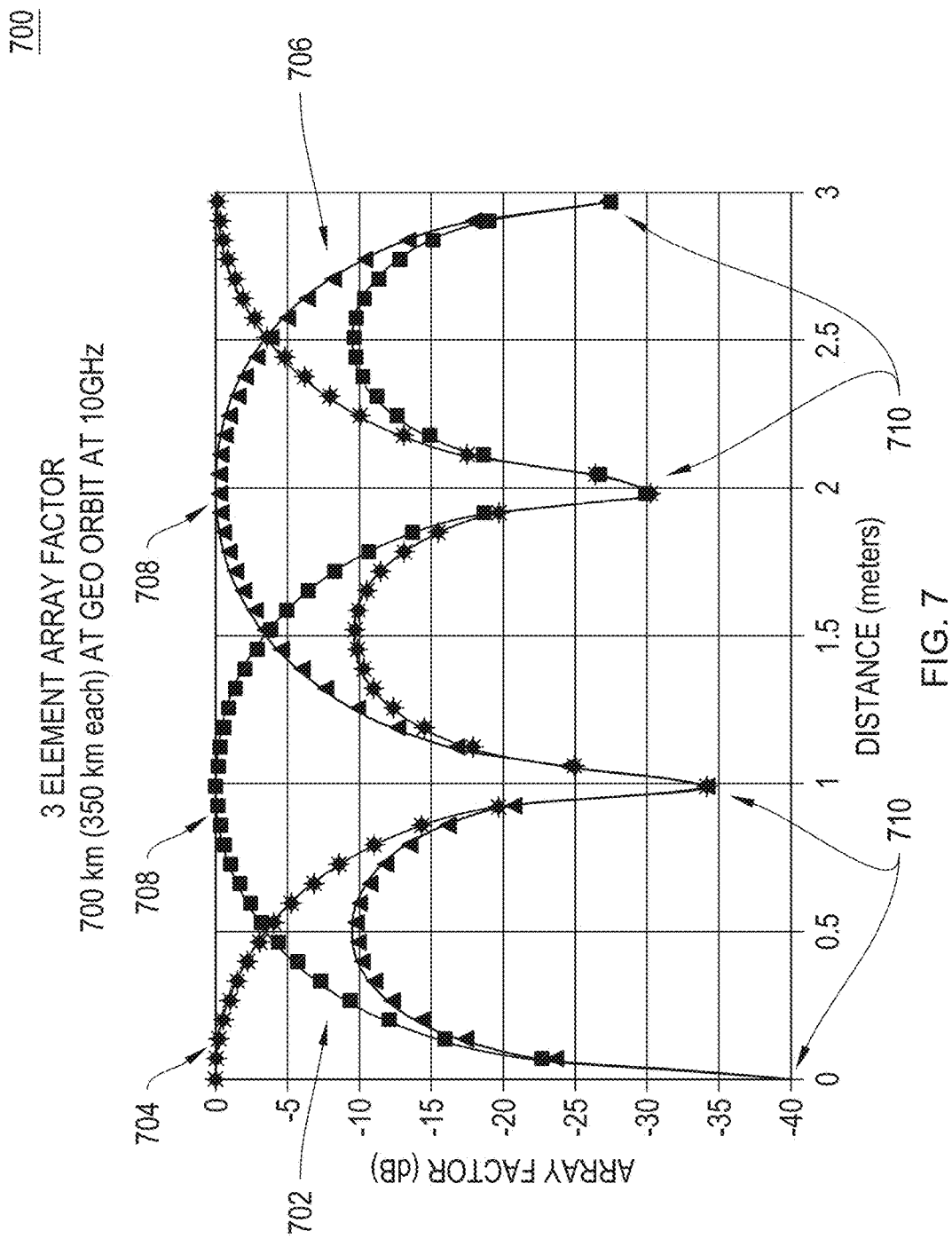
FIG. 7 shows an illustrative example of three orthogonal synthesized antenna beams from three ground stations, in accordance with an embodiment of the present disclosure.

FIG. 7 depicts three orthogonal synthesized antenna beams 702, 704, and 706 from three ground stations spaced over 700 km (350 km between each station) where the beams have peaks 708 on 1 meter spacings with nulls 710 on the other 1 meter increments (thus spatially orthogonal) leading to the term OSDM.

In some embodiments, an array of receiving stations may be utilized to resolve the signals from two or more transmitting antennas. In some embodiments, the number of receiving stations in the array may be more than the number of transmitting antennas. As an illustrative example, a large, sparse antenna array, such as the Allen Telescope Array, may be utilized with the OSDM methods as described herein to resolve two X-band antennas on a satellite orbiting the Earth at low earth orbit. The array of receiving stations may be configured to beam-form the received signal such that the received signal peaks at one of the transmitting antennas and has a null at each of the other transmitting antennas. The array of receiving stations may also be configured to adaptively beam-form the received signal as the antennas move through changing geometries. For example, the distance from a satellite at low earth orbit to the array of receiving stations may range from a few hundred kilometers when the satellite is directly overhead to a few thousand kilometers when the satellite is near the horizon. As the angular separation of the transmitting antennas decreases as range increases, the ground antenna array adapts the beam programming to maintain peaks and nulls over these smaller angles to maintain the OSDM throughout the satellite pass.

The method may further comprise determining the first signal and the second signal based on the received first combined signal and the received second combined signal. In some embodiments, determining the first and second signal comprises combining the received first combined signal and the second combined signal. For example, beamformers may be utilized to combine the received first combined signal and the second combined signal, taking into account, for example, the number of antennas, array spacing, total array size, signal frequency, signal phase shift, and/or time delay. In some embodiments, the beamformers may be adaptive with closed loop control to maintain multiple beamformer peaks and nulls.

Although the aforementioned method is discussed in relation to two satellite antennas and two receiving stations, it will be appreciated by a person of ordinary skill in the art that any number of satellite antennas and receiving stations may be utilized with the systems and methods described herein. In some embodiments, the number of frequency reuses may be less than, or equal to, the number of ground antennas. In some embodiments, the number of ground antennas may be greater than, or equal to, the number of satellite antennas. In some embodiments, the method may further comprise receiving, at a third receiving station, a third combined signal comprising the first signal transmitted by the first satellite antenna and the second signal transmitted by the second satellite antenna. The third combined signal may be the same or different than the first and the second combined signal.

The third combined signal may have a different magnitude, phase, and/or time delay than the first or the second combined signal. The third receiving station may be separated from the second receiving station by a third distance, and in some embodiments, the third distance is equal to the second distance. In embodiments where more than two receiving stations are utilized, the receiving stations may be arranged in any suitable orientation and with any suitable spacing. For example, three receiving stations may be spaced equally along a line. In another example, three receiving stations may be spaced equally at the corners of an equilateral triangle.

In some embodiments, the first, second, and/or third combined signals may further comprise a third signal transmitted by a third satellite antenna. The third signal may be transmitted at the same frequency, polarization, and/or coverage area as the first and the second signals. The third satellite antenna may be spaced from the first and the second satellite antenna. The three satellite antennas may be arranged in any suitable orientation and with any suitable spacing. For example, the three antennas may be arranged along a straight line or at the corners of an equilateral triangle.

FIG. 1 shows an illustrative diagram of a satellite communications system, in accordance with an embodiment of the present disclosure. The system 100 includes a first satellite antenna 102, a second satellite antenna 104, a boom or structure that separates the antennas 106, a first receiving station 108, and a second receiving station 110. First satellite antenna 102 may transmit signals 114 and 116, and second satellite antenna 104 may transmit signals 118 and 120. First receiving station and second receiving station may be separated by distance 112.

First satellite antenna 102 may be any suitable antenna for transmitting signals from a satellite to one or more ground stations. For example, first satellite antenna 102 may include one or more feed horns and/or one or more reflector dishes configured to transmit signals to the receiving stations 108 and 110. In some embodiments, the first satellite antenna 102 may be configured to transmit a spot beam that is concentrated in power over a limited geographical area on Earth. In alternate embodiments, the first satellite antenna 102 may be configured to transmit an omni-directional signal with power distributed substantially equally in all directions. The first satellite antenna 102 may include an adjustment mechanism, such as one or more motors, which may adjust the direction of first satellite antenna 102. The first satellite antenna 102 may transmit signal 114 to receiving station 108 and signal 116 to receiving station 110. In some embodiments, signals 114 and 116 may be the same signal transmitted in an omni-directional or spot beam. Signals 114 and 116 may be transmitted in any suitable manner and at any suitable frequency, polarization, and/or coverage area.

In some embodiments, the second satellite antenna 104 may be substantially similar to first satellite antenna 102. Second satellite antenna may transmit signals 118 and 120 to receiving stations 108 and 110. In some embodiments, second satellite antenna 104 may comprise an omni-directional antenna, in which power is distributed substantially equally in all directions. In such embodiments, signals 118 and 120 may be substantially equal. In alternate embodiments, second satellite antenna 104 may transmit signals 118 and 120 in a spot beam directed to a specific geographical location on Earth. In some embodiments, signals 118 and 120 may be transmitted at the same frequency, polarization, and/or coverage area as signals 114 and 116.

The first satellite antenna 102 and second satellite antenna 104 may be separated by a first distance. In some embodiments, the first satellite antenna 102 and the second satellite antenna 104 may be on the same satellite. For example, the first satellite antenna 102 and the second satellite antenna 104 may be connected using a rigid boom 106. The rigid boom may ensure that the first satellite antenna 102 and the second satellite 104 maintain the first distance. In alternate embodiments, the first satellite antenna 102 and the second satellite antenna 104 may fly in formation to maintain the first distance.

Receiving stations 108 and 110 may be located on Earth and separated by a second distance 112. The receiving station's signals are connected through a signal interconnect 130 to a beamformer network 140. Although the beamformer network 140 is depicted in FIG. 1 as located separately from receiving stations 108 and 110, the beamformer network may be located at either one or both of receiving stations 108 and 110. In some embodiments, the spacing of antennas 102 and 104 may be proportional to the distance 112, the wavelength/frequency/polarization of signals 114, 116, 118, or 120, and/or the satellite range/altitude. Due to the distance 112, the signal 114 may be received at the receiving station 108 before signal 116 is received at receiving station 110, thereby resulting in signal 116 having a different magnitude and/or phase than signal 114. Similarly, signal 118 may be received at the receiving station 110 before signal 120 is received at receiving station 108, thereby resulting in signal 118 having a different magnitude and/or phase than signal 120.

Signals 114 and 120, received at receiving station 108, may comprise a first combined signal, and signals 116 and 118, received at receiving station 110, may comprise a second combined signal. Based on the received combined signal through interconnects 130, the beamformer 140 may isolate the signals 114, 116, 118, and 120. The beamformer 140 may be at either one of receiving stations 108, 110, or at an external ground location for processing only.

Figure 2:
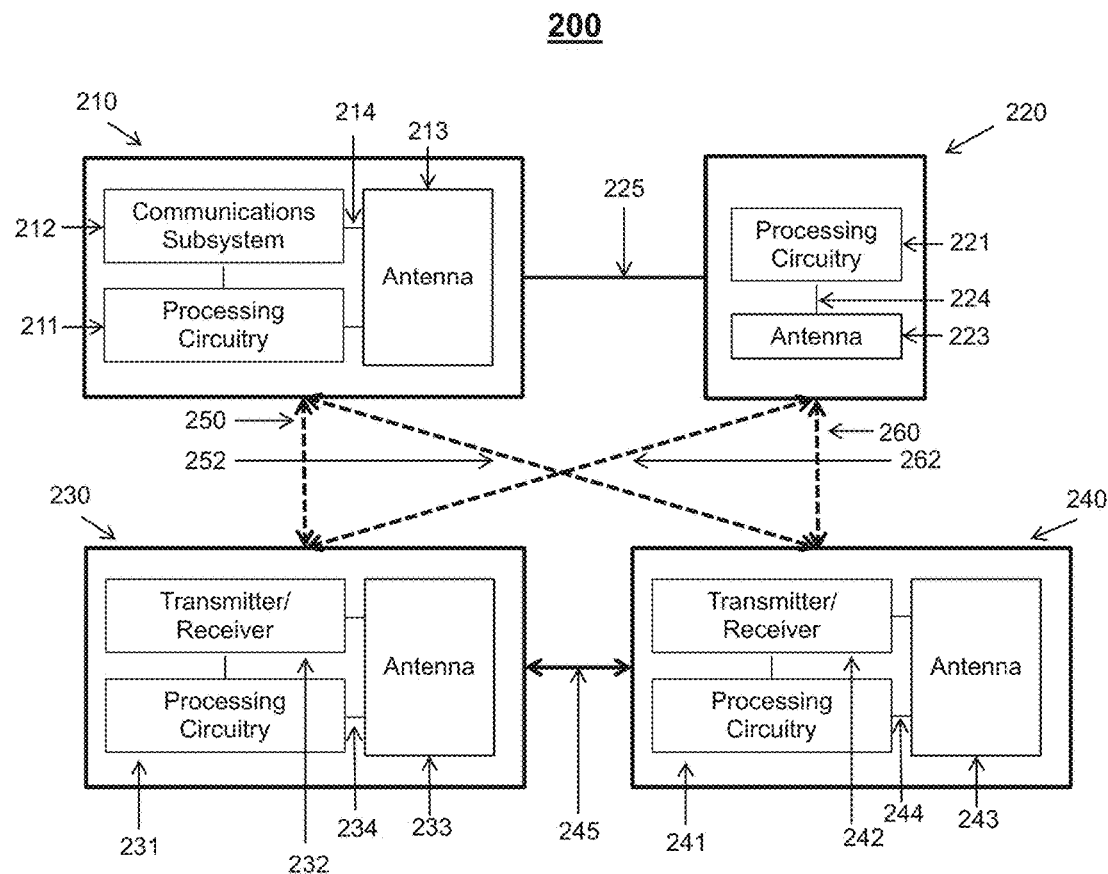
FIG. 2 shows an illustrative block diagram of a satellite communications system, in accordance with an embodiment of the present disclosure.

FIG. 2 shows an illustrative block diagram 200 of a satellite communications system, in accordance with an embodiment of the present disclosure. The satellite 210 may include communications subsystem 212, processing circuitry 211, antenna 213, and communications network 214. The secondary satellite 220 may comprise processing circuitry 221, antenna 223, and communications network 224. The satellite 210 and secondary satellite 220 may be connected by boom 225 or may be attached as one body having two antennas. Ground station 230 may comprise processing circuitry 231, transmitter/receiver 232, antenna 233, and communications network 234. Ground station 240, which may be substantially similar to ground station 230, may comprise processing circuitry 241, transmitter/receiver 242, antenna 243, and communications network 244. The ground stations 230 and 240 may communicate with each other through communications network 245. Satellite 210 may transmit signals 250 and 252 to ground stations 230 and 240, respectively, and secondary satellite 220 may transmit signals 260 and 262 to ground stations 230 and 240, respectively. Ground stations 230 and 240 may be more detailed representations of receiving stations 108 and 110, depicted in FIG. 1.

Processing circuitry 211, 221, 231, and 241 may be any suitable processor(s) for performing the methods disclosed herein. For example, as discussed in further detail below in relation to FIG. 3, processing circuitry 211, 221, 231, and 241 may be a conventional computer processor. Antennas 213 and 223 may be substantially similar to antennas 102 and 104 depicted in FIG. 1, and may be suitable for transmitting signals 250, 252, 260, and 262 at any suitable frequency, polarization, and/or coverage area. In some embodiments, communications subsystem 212 may be included in processing circuitry 211. In alternate embodiments, communications subsystem 212 may comprise separate processing circuitry configured to perform specialized communications commands. For example, communications subsystem 212 may receive signals from antenna 213, amplify the received signals, and transmit them to processing circuitry 211 through communications network 214. Communications subsystem 212 may also include beamformers for combining received signals or directing transmitted signals 250 and 252. Communications networks 214, 224, 234, 244, and 245 may comprise any suitable network, including, but not limited to, Local Area Network (LAN), Wide Area Network (WAN), Wide Local Area Network (WLAN), or any other wired or wireless network or combination thereof.

Ground station 230 may receive signals 250 and 262 using antenna 233. Signals 250 and 262 may be passed to transmitter/receiver 232, which may comprise specialized circuitry for signal processing. For example, transmitter/receiver 232 may comprise beamformers, as discussed in relation to FIG. 5 below, for combining the received signals 250 and 262 or directing transmitted signals. Transmitter/receiver 232 may also process control signals, calculated by processing circuitry 231, and transmit them through antenna 233. One or both of received signals 250 and 262 may be transmitted to ground station 240 through communications network 245. Similar to ground station 230, ground station 240 may receive signals 252 and 260 using antenna 243. Signals 252 and 260 may be passed to transmitter/receiver 242, which may comprise specialized circuitry for signal processing. For example, transmitter/receiver 242 may comprise beamformers, as discussed in relation to FIG. 5 below, for combining the received signals 252 and 260 or directing transmitted signals. Transmitter/receiver 242 may also process control signals, calculated by processing circuitry 241, and transmit them through antenna 243. One or both of received signals 252 and 260 may be transmitted to ground station 230 through communications network 245.

Figure 3:
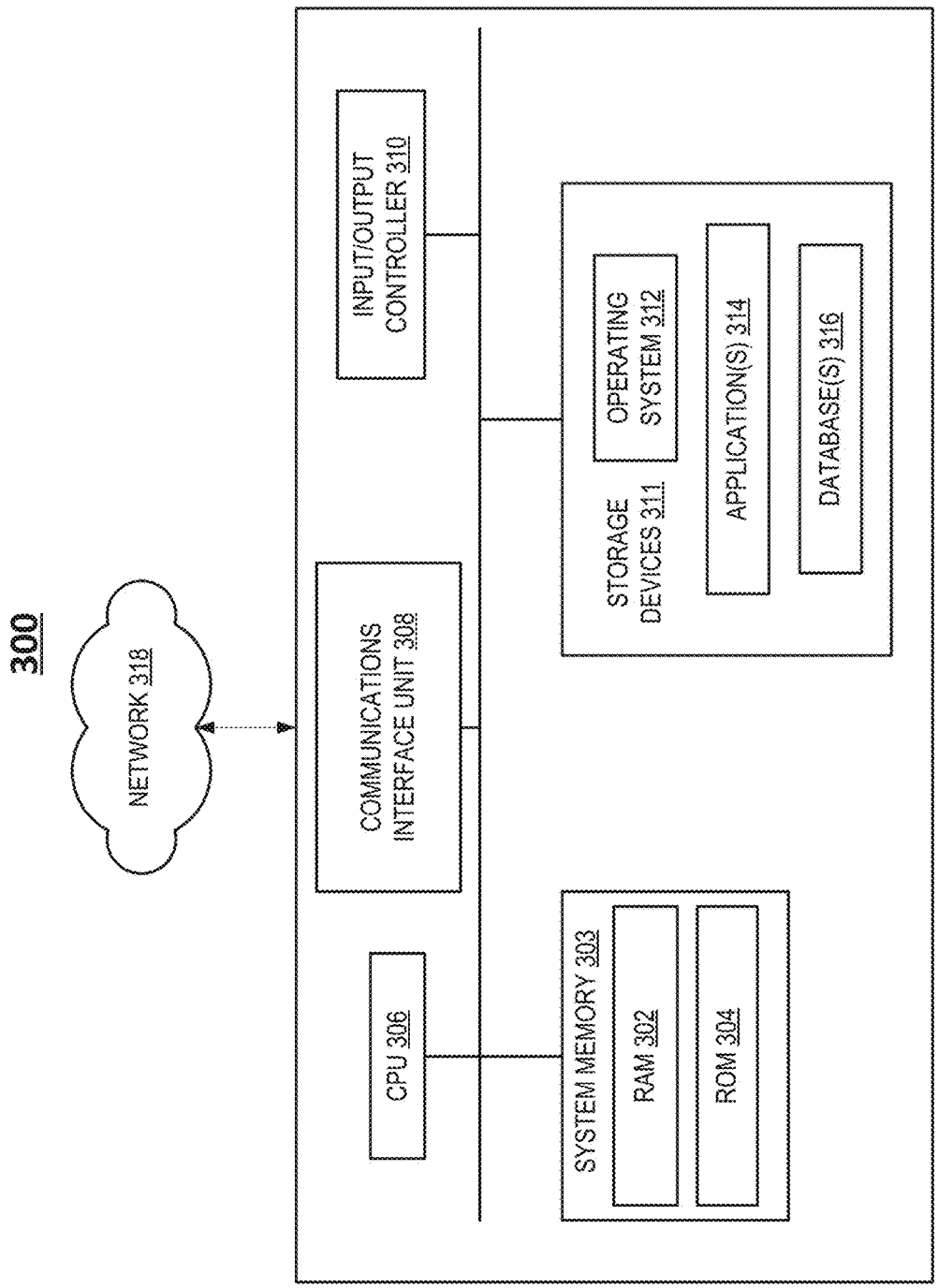
FIG. 3 shows a block diagram of a computing device, for performing any of the processes described herein, in accordance with an embodiment of the present disclosure.

FIG. 3 shows a block diagram of a computing device 300, for performing any of the processes described herein, in accordance with an embodiment of the present disclosure. Any one of processing circuitry 211, 221, 231, or 241, as depicted in FIG. 2, may comprise one or more computing device 300. In some embodiments, a plurality of the processing circuitry 211, 221, 231, or 241, or a combination of any of the other components depicted in FIG. 2, may be included within one computing device 300.

The computing device 300 comprises at least one communications interface unit 308, an input/output controller 310, system memory 303, and one or more data storage devices 311. The system memory 303 includes at least one Random Access Memory (RAM 302) and at least one Read-Only Memory (ROM 304). All of these elements are in communication with a Central Processing Unit (CPU 306) to facilitate the operation of the computing device 300. The computing device 300 may be configured in many different ways. For example, the computing device 300 may be a conventional standalone computer or alternatively, the functions of computing device 300 may be distributed across multiple computer systems and architectures. In FIG. 3, the computing device 300 is linked, via network 318 or local network, to other servers or systems. The network 318 may connect to a receiving station, such as receiving stations 108 and 110 or to satellites 102 and 104.

The computing device 300 may be configured in a distributed architecture, wherein databases and processors are housed in separate units or locations. Some units perform primary processing functions and contain, at a minimum, a general controller or a processor and a system memory 303. In distributed architecture embodiments, each of these units may be attached via the communications interface unit 308 to a communications hub or port (not shown) that serves as a primary communication link with other servers, client or user computers, and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM, and TCP/IP.

The CPU 306 may comprise one or more processors, such as one or more conventional microprocessors and/or one or more supplementary co-processors. In some embodiments, the CPU 306 may be a general microprocessor. In other embodiments, the CPU 306 may comprise a specialized processor and/or integrated circuit, such as an Application-Specific Integrated Circuit (ASIC), a Digital Signal Processor (DSP), Graphics Processor Unit (GPU), or a Field-Programmable Gate Array (FPGA). The CPU 306 is in communication with the communications interface unit 308 and the input/output controller 310, through which the CPU 306 communicates with other devices such as other servers, user terminals, or devices. The communications interface unit 308 and the input/output controller 310 may include multiple communication channels for simultaneous communication with, for example, other processors, servers, or client terminals.

The CPU 306 is also in communication with the data storage device 311. The data storage device 311 may comprise an appropriate combination of magnetic, optical or semiconductor memory, and may include, for example, RAM 302, ROM 304, flash drive, an optical disc such as a compact disc or a hard disk or drive. The CPU 306 and the data storage device 311 each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 306 may be connected to the data storage device 311 via the communications interface unit 308. The CPU 306 may be configured to perform one or more particular processing function(s).

The data storage device 311 may store, for example, (i) an operating system 312 for the computing device 300; (ii) one or more applications 314 (e.g., computer program code or a computer program product) adapted to direct the CPU 306 in accordance with the systems and methods described here, and particularly in accordance with the processes described in detail with regard to the CPU 306; or (iii) database(s) 316 adapted to store information that may be utilized to store information required by the program.

The operating system 312 and applications 314 may be stored, for example, in a compressed, uncompiled, and/or encrypted format, and may include computer program code. The instructions of the program may be read into a main memory of the processor from a computer-readable medium other than the data storage device 311, such as from the ROM 304 or from the RAM 302. While execution of sequences of instructions in the program causes the CPU 306 to perform the process steps described herein, hardwired circuitry may be used in place of, or in combination with, software instructions for embodiment of the processes of the present disclosure. Thus, the systems and methods described are not limited to any specific combination of hardware and software.

The term "computer-readable medium" as used herein refers to any non-transitory medium that provides or participates in providing instructions to the processor of the computing device 300 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media includes Dynamic Random Access Memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (Electronically Erasable Programmable Read-Only Memory), a FLASH-EEPROM, any other memory chip or cartridge, or any other non-transitory medium from which a computer may read.

Various forms of computer readable media may be involved in carrying one or more sequences of one or more instructions to the CPU 306 (or any other processor of a device described herein) for execution. For example, the instructions may initially be borne on a magnetic disk of a remote computer (not shown). The remote computer may load the instructions into its dynamic memory and send the instructions over a wireless connection using a high gain antenna. A communications device local to a computing device 300 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communications port as electrical, electromagnetic or optical signals, which are exemplary forms of wireless communications or data streams that carry various types of information.

Figure 4:
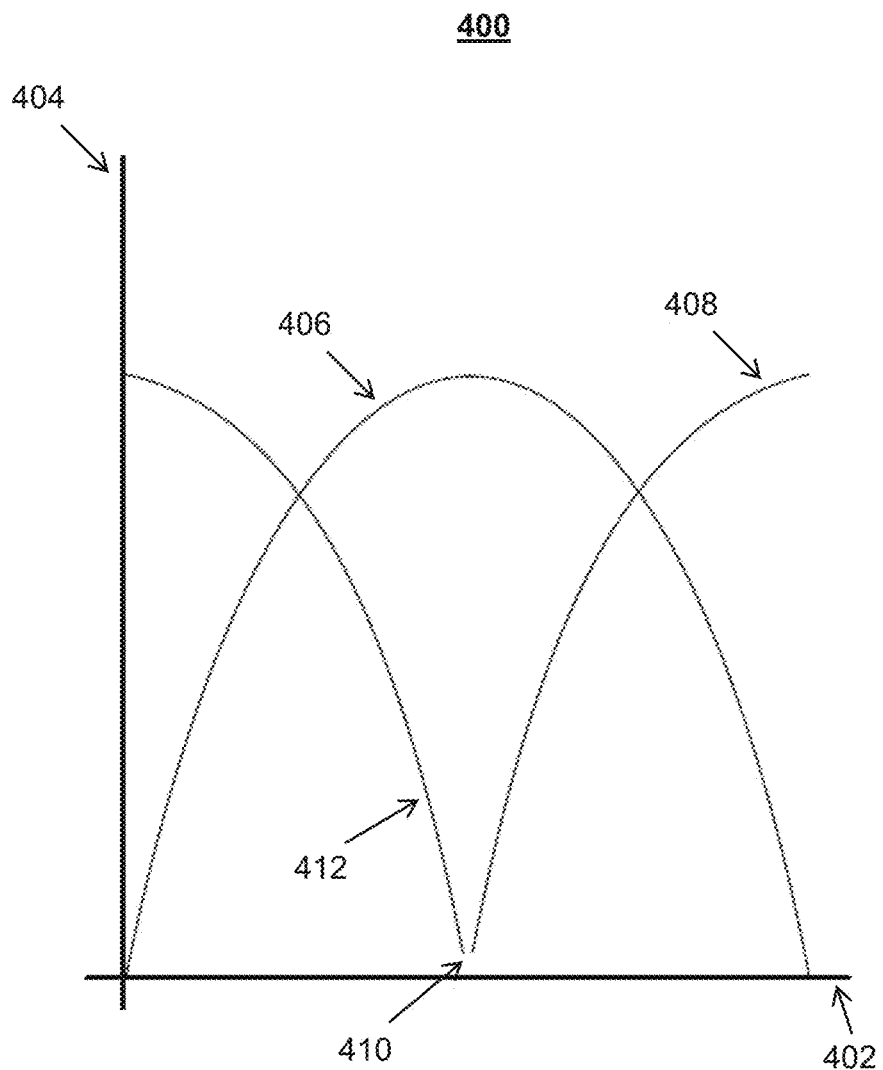
FIG. 4 shows an illustrative example of a frequency reuse profile of a system utilizing two ground arrays to resolve two satellite antennas, in accordance with an embodiment of the present disclosure.

FIG. 4 shows an illustrative example of a frequency reuse profile 400 of a system utilizing an array of two ground antennas to resolve two satellite antennas, in accordance with an embodiment of the present disclosure. Frequency reuse profile 400 may include sum channel 408 which includes transition zone 412 and a substantial minimum at 410. Frequency reuse profile 400 may also include difference channel 406. Axis 402 may represent a satellite offset, such as the distance between two transmitting antennas including the length of boom 106 or boom 225. Axis 404 may represent the relative gain of the sum and difference channel in decibels, or any other unit of magnitude.

Sum channel 408 may represent the beam-formed sum of two signals received at two separate ground stations, such as ground stations 108 and 110 depicted in FIG. 1, as satellite offset is varied. Difference channel 406 may be the beam-formed difference of the two received signals at the ground stations as the satellite offset is varied. The difference channel 406 may exhibit a substantial maximum at zero offset, and the sum channel 408 may exhibit a substantial null at some non-zero offset where the difference channel has a peak.

The substantial maximum of the difference channel 406 and the substantial null of the sum channel 408 may occur at the same offset or different offsets. The transition zone 412 of sum channel 408 may exhibit a high slope, which may aid in the detection and/or automatic beamformer control of the null at 410. As an illustrative example, a satellite and a remote antenna may be separated by a body or boom of a fixed distance (i.e., offset). In some embodiments, the satellite and the remote antenna may be flying in a geostationary orbit such that the coverage area of their respective antennas remains relatively constant. The satellite and the remote antenna may each transmit a signal at 2.1 GHz, which are received by two ground stations separated by 600 m. The transmitted signals may combine and interfere with each other in space during transmission. As the boom distance is varied, the sum channel may exhibit a null at 30 m. If the boom distance is configured to 30 m, the ground stations may be able to isolate the signals transmitted from the satellite and the remote antenna, even if they are transmitted at the same frequency, polarization, and/or coverage area.

Figure 8:
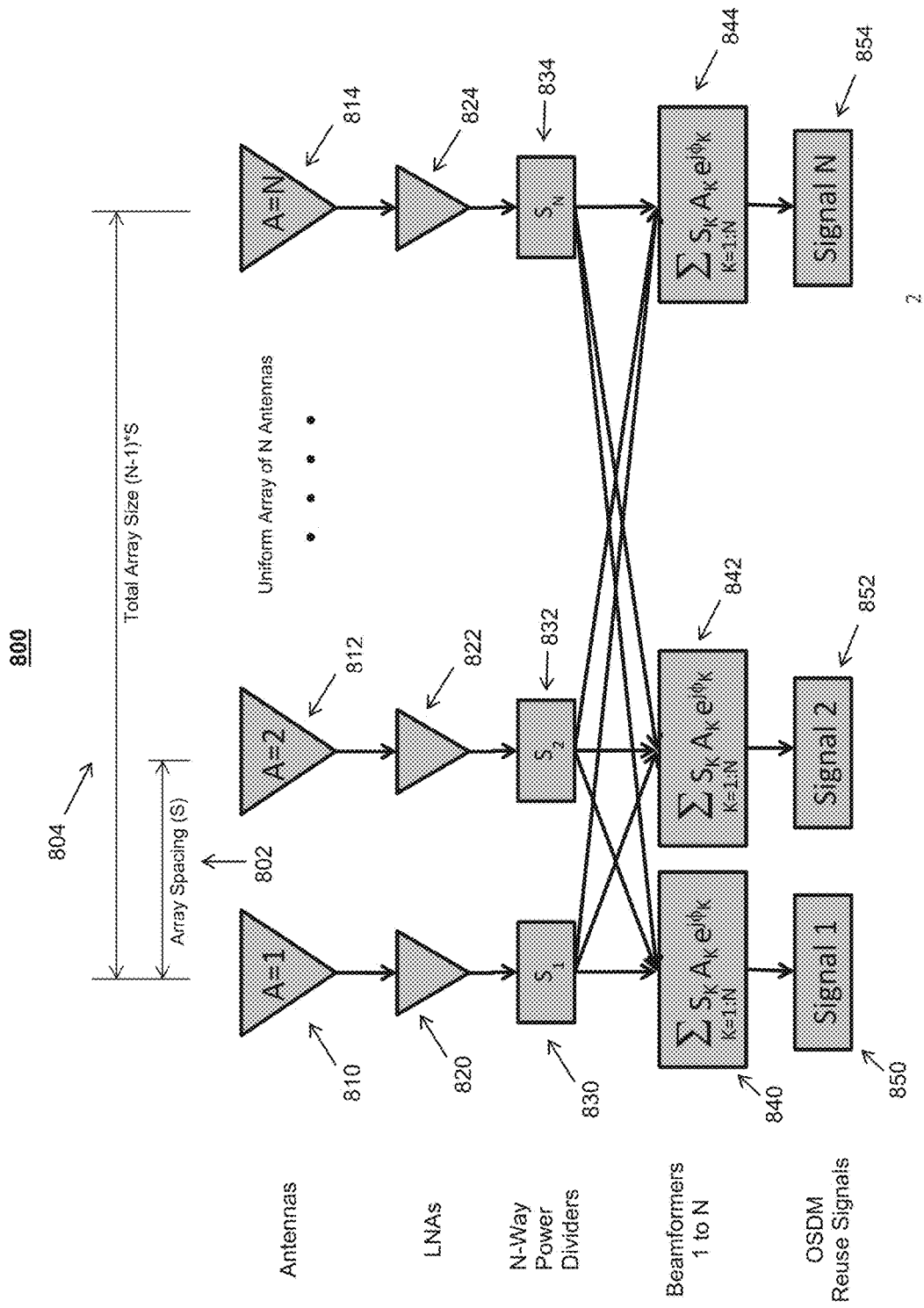
FIG. 8 shows an illustrative block diagram of a system which generates OSDM reuse signals, in accordance with an embodiment of the present disclosure.

FIG. 8 shows an illustrative block diagram of a system 800 which generates OSDM reuse signals, in accordance with an embodiment of the present disclosure. System 800 may comprise an array of N antennas 810, 812, and 814, denoted by the notation (A=1, 2 ... N). Each of the antennas may be separated by a spacing (S) 802, for a total array size 804 of (N−1)*S. Although the illustrative embodiment in FIG. 8 is described in relation to a uniform array with uniform spacing, it will be understood by one skilled in the art that the methods and systems described herein may be utilized with any suitable spacing and/or orientation of the N antennas 810, 812, and 814. Each of the N antennas 810, 812, and 814 may receive respective signals from two or more satellites in orbit and send the received signals to Low Noise Amplifiers (LNAs) 820, 822, and 824, respectively. LNAs 820, 822, and 824 may be an electronic amplifier used to boost the signal power of the received signals while injecting minimal noise. The amplified signals may pass to N-Way Power Dividers 830, 832, and 834. Each of the N-Way Power Dividers may divide their respective signals into N equal components and send the components to beamformers 840, 842, and 844. Thus, each of beamformers 840, 842, and 844 may receive a component of the signals received by antennas 810, 812, and 814. Each of the beamformers 840, 842, and 844 may combine the signals according to the relationship:

$$\sum_{K=1:N} S_k A_k e^{j\phi_K}$$

wherein $e^j$ is the complex exponential, $A_K$=amplitude weight, and $\phi_K$=signal phase correction. The output of beamformers 840, 842, and 844 are the OSDM reuse signals 850, 852, and 854 (i.e., each of the individual satellites transmit signals but with the co-channel interference of each of the other signals removed).

FIG. 9 shows a flow diagram of illustrative steps for communications bandwidth enhancement using OSDM, in accordance with an embodiment of the present disclosure. Process 900 may comprise receiving, at a first receiving station, a first combined signal comprising a first signal transmitted by a first satellite antenna, and a second signal transmitted by a second satellite antenna (902), receiving, at a second receiving station, a second combined signal comprising a first signal transmitted by a first satellite antenna and a second signal transmitted by a second satellite antenna (904), distributing the first and second combined signals to one or more beamformers (906), and determining the first signal and the second signal based on the received first and second combined signals (908). Process 900 may be performed on an ongoing basis to continuously receive and isolate the first and second signals transmitted from a first and second satellite antenna.

At 902, a first receiving station, such as receiving station 108, may receive a first combined signal comprising a first signal transmitted by a first satellite antenna 102 and a second signal transmitted by a second satellite antenna 104. In some embodiments, the first satellite antenna and the second satellite antenna may be on the same satellite or on different satellites and may be separated by a first distance. In some embodiments, the satellite(s) may be orbiting the Earth at a geostationary orbit (e.g., approximately 22,236 miles above the Earth's equator) such that the satellite(s) maintain substantially the same position above the Earth's surface, or could be a low earth orbit satellite, or aircraft, or other distant object, having multiple antennas. The first and second signal may be transmitted at a single frequency, polarization, and/or coverage area.

At 902, a second receiving station, such as receiving station 110, may receive, at a second receiving station, a second combined signal comprising a first signal transmitted by a first satellite antenna 102 and a second signal transmitted by a second satellite antenna 104. The second combined signal may be the same signal or a different signal as the first combined signal. The first and the second receiving station 108 and 110, as depicted in FIG. 1, may be separated by a distance 112. The separation of the first and second satellite antennas may be proportional to the satellite range/altitude, wavelength/frequency of the transmitted signals, and/or the spacing of the receiving stations.

At 904, the first and second receiving stations 108 and 110 may distribute the first and second combined signals to one or more beamformers. At 908, the beamformers may determine the first signal and the second signal transmitted by the first and second satellite antennas based on the received first and second combined signals. For example, as discussed above in relation to FIG. 5, the beamformers may calculate OSDM reuse signals based on the first and second combined signals and one or more of the number of antennas, array spacing, total array size, signal frequency, signal phase shift, and/or time delay.

While preferable embodiments have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in practice.

What is claimed is:

1. A system for generating orthogonal frequency division multiplexing (OSDM) reuse signals, the system comprising:
   a first beamforming assembly comprising:
      a first signal source configured to provide a first signal;
      a first low noise amplifier communicatively coupled with the first signal source and configured to amplify the first signal;
      a first power divider communicatively coupled with the first low noise amplifier; and
      a first beamformer;
   a second beamforming assembly comprising:
      a second signal source configured to provide a second signal;
      a second low noise amplifier communicatively coupled with the second signal source and configured to amplify the second signal;
      a second power divider communicatively coupled with the second low noise amplifier; and
      a second beamformer;
   wherein the first and second power dividers are each communicatively coupled with the first and second beamformer, and wherein the first power divider is configured to divide the amplified first signal into a first beamformer component for sending to the first beamformer and a second beamformer component for sending to the second beamformer, and the second power divider is configured to divide the amplified second signal into a first beamformer component for sending to the first beamformer and a second beamformer component for sending to the second beamformer; and
   wherein the first beamformer includes program means for combining, based on a total array size of the first beamforming assembly and the second beamforming assembly, the received first beamformer components of the first signal and second signal into a first combined signal, and the second beamformer includes program means for combining, based on the first distance, the received second beamformer components of the first signal and second signal into a second combined signal, the first and second combined signals having one or more of a shared frequency, a shared signal polarization, and a shared coverage area, the first and second combined signals formed such that, when the combined signal is received, an additive array factor is provided resulting in a peak in one of the first signal and the second signal and a null on the other of the first signal and second signal.

2. The system of claim 1, wherein
   the first signal source is a first antenna configured to receive the first signal and the second signal source is a second antenna configured to receive the second signal.

3. The system of claim 2, wherein the plurality of antennas are on a single satellite, aircraft, or structure.

4. The system of claim 2, wherein the plurality of antennas are on different satellites, aircraft, or structures.

5. The system of claim 2, wherein the first signal is received from a first satellite and the second signal is received from a second satellite.

6. The system of claim 2, wherein the array size is defined by a first distance of separation between the first antenna and the second antenna.

7. The system of claim 2, wherein the first and second beamforming assemblies are included in a plurality of beamforming assemblies that define a beamforming array including a plurality of antennas, the array size defined by a first distance of separation between antennas in the beamforming array.

8. The system of claim 1, further comprising:
   a third beamforming assembly comprising:
      a third signal source configured to provide a third signal;
      a third low noise amplifier communicatively coupled with the third signal source and configured to amplify the third signal;
      a third power divider communicatively coupled with the third low noise amplifier; and
      a third beamformer;
   wherein the first, second, and third power dividers are each communicatively coupled with the first, second, and third beamformers, and wherein the first power divider is further configured to divide the amplified first signal into a third beamformer component for sending to the third beamformer, the second power divider is further configured to divide the amplified second signal into a third beamformer component for sending to the third beamformer, and wherein the third power divider is configured to divide the amplified third signal into a first beamformer component for sending to the first beamformer, a second beamformer component for sending to the second beamformer, and a third beamformer component for sending to the third beamformer; and
   wherein the program means of the first beamformer are further for combining, based on an array size of the first, second, and third beamforming assemblies, the received first beamformer component of the third signal into the first combined signal, the program means of the second beamformer are further for combining, based on the array size of the first, second, and third beamforming assemblies, the received second beamformer component of the third signal into the second combined signal, and wherein the third beamformer includes program means for combining, based on the array size of the first, second, and third beamforming assemblies, the received third beamformer components of the first, second, and third signals into a third combined signal, the first, second, and third combined signals having one or more of a shared frequency and a shared signal polarization, the first, second, and third combined signals formed such that, when the combined signal is received, an additive array factor is provided resulting in a peak in one of the first signal, the second signal, and third signal, and nulls on the others of the first signal, second signal, and third signal.

9. A System for receiving orthogonal frequency division multiplexing (OSDM) reuse signals, the system comprising:
a first receiving station configured to receive a first combined signal transmitted by a first beamformer assembly and a second combined signal transmitted by a second beamformer assembly, the first and second combined signals each comprising a first signal and a second signal and each transmitted at one or more of a shared frequency, a shared signal polarization, and a shared coverage area;
a second receiving station configured to receive the first combined signal and the second combined signal, the first receiving station and the second receiving station are separated by a first distance; and
processing circuitry configured to determine the first signal and the second signal based on the received first combined signal and the received second combined signal;
wherein the first distance of separation between the first receiving station and the second receiving station is based on an array size of the first beamformer assembly and the second beamformer assembly such that an additive array factor is provided resulting in a peak on one of the first beamformer assembly and second assembly and a null on the other of the first beamformer assembly and second beamformer assembly, and wherein determining the first signal and the second signal from the received first and second combined signals is further based on the additive array factor.

10. The system of claim 9, wherein the first beamforming assembly comprises:
a first signal source configured to provide the first signal;
a first low noise amplifier communicatively coupled with the first signal source and configured to amplify the first signal;
a first power divider communicatively coupled with the first low noise amplifier; and
a first beamformer; and
the second beamforming assembly comprises:
a second signal source configured to provide the second signal;
a second low noise amplifier communicatively coupled with the second signal source and configured to amplify the second signal;
a second power divider communicatively coupled with the second low noise amplifier; and
a second beamformer;
wherein the first and second power dividers are each communicatively coupled with the first and second beamformer, and wherein the first power divider is configured to divide the amplified first signal into a first beamformer component for sending to the first beamformer and a second beamformer component for sending to the second beamformer, and the second power divider is configured to divide the amplified second signal into a first beamformer component for sending to the first beamformer and a second beamformer component for sending to the second beamformer; and
wherein the first beamformer includes program means for combining, based on the array size of the first beamforming assembly and the second beamforming assembly, the received first beamformer components of the first signal and second signal into a first combined signal, and the second beamformer includes program means for combining, based on the first distance, the received second beamformer components of the first signal and second signal into a second combined signal, the first and second combined signals having one or more of a shared frequency, a shared signal polarization, and a shared coverage area, the first and second combined signals formed such that, when the combined signal is received, the additive array factor is provided resulting in a peak in one of the first signal and the second signal and a null on the other of the first signal and second signal.

11. The system of claim 10, wherein
the first signal source is a first antenna configured to receive the first signal and the second signal source is a second antenna configured to receive the second signal.

12. The system of claim 11, wherein the plurality of antennas are on a single satellite, aircraft, or structure.

13. The system of claim 11, wherein the plurality of antennas are on different satellites, aircraft, or structures.

14. The system of claim 11, wherein the first signal is received from a first satellite and the second signal is received from a second satellite.

15. The system of claim 11, wherein the array size is defined by a first distance of separation between the first antenna and the second antenna.

16. The system of claim 11, wherein the first and second beamforming assemblies are included in a plurality of beamforming assemblies that define a beamforming array including a plurality of antennas, the array size defined by a first distance of separation between antennas in the beamforming array.

17. The system of claim 9, further comprising:
a third receiving station configured to receive the first combined signal, the second combined signal transmitted, and a third combined signal transmitted by a third beamformer assembly, the first and second combined signals further comprising a third signal and the third combined signal comprising the first, second and third signal, the first, second, and third combined signals each transmitted at one or more of a shared frequency, a shared signal polarization, and a shared coverage area, the first receiving station, the second receiving station, and third receiving station having a receiving array size defined by the first distance; and
wherein the processing circuitry is further configured to determine the first signal, second signal, and the second signal based on the received first, second and third combined signals;
wherein the receiving array size is based on an array size of the first beamformer assembly and the second beamformer assembly such that an additive array factor is provided resulting in a peak on one of the first beamformer assembly, second beamformer assembly, and third beamformer assembly, and a null on the other of the first, second, and third beamformer assembly, and wherein determining the first signal, the second signal, and the third signal from the received first, second, and third combined signals is further based on the additive array factor.

18. The system of claim 17, wherein:
the third beamforming assembly comprises:
a third signal source configured to provide the third signal;

a third low noise amplifier communicatively coupled with the third signal source and configured to amplify the third signal;

a third power divider communicatively coupled with the third low noise amplifier; and a third beamformer;

wherein the first, second, and third power dividers are each communicatively coupled with the first, second, and third beamformers, and wherein the first power divider is further configured to divide the amplified first signal into a third beamformer component for sending to the third beamformer, the second power divider is further configured to divide the amplified second signal into a third beamformer component for sending to the third beamformer, and wherein the third power divider is configured to divide the amplified third signal into a first beamformer component for sending to the first beamformer, a second beamformer component for sending to the second beamformer, and a third beamformer component for sending to the third beamformer; and wherein the program means of the first beamformer are further for combining, based on an array size of the first, second, and third beamforming assemblies, the received first beamformer component of the third signal into the first combined signal, the program means of the second beamformer are further for combining, based on the array size of the first, second, and third beamforming assemblies, the received second beamformer component of the third signal into the second combined signal, and wherein the third beamformer includes program means for combining, based on the array size of the first, second, and third beamforming assemblies, the received third beamformer components of the first, second, and third signals into the third combined signal, the first, second, and third combined signals having one or more of a shared frequency, a shared signal polarization, and shared coverage area, the first, second, and third combined signals formed such that, when the combined signal is received, the additive array factor is provided resulting in a peak in one of the first signal, the second signal, and third signal, and nulls on the others of the first signal, second signal, and third signal.

* * * * *